United States Patent
Tabata et al.

[11] Patent Number: 5,522,779
[45] Date of Patent: Jun. 4, 1996

[54] SHIFT CONTROL SYSTEM FOR AUTOMATIC TRANSMISSION

[75] Inventors: Atsushi Tabata, Okazaki; Yasuo Hojo, Nagoya; Masato Kaigawa, Toyota; Hiromichi Kimura, Okazaki; Hidehiro Oba, Aichi-ken; Kazumasa Tsukamoto, Toyota; Masahiro Hayabuchi, Anjo; Masahiko Ando, Okazaki; Yoshihisa Yamamoto, Nishio, all of Japan

[73] Assignee: Aisin Aw Co., Ltd., Japan

[21] Appl. No.: 298,710

[22] Filed: Aug. 30, 1994

[30] Foreign Application Priority Data

Aug. 30, 1993 [JP] Japan .................... 5-237353

[51] Int. Cl.$^6$ ..................... B60K 41/06; F16H 61/16
[52] U.S. Cl. .............................. 477/126; 477/152
[58] Field of Search ................... 477/116, 125, 477/126, 150, 152

[56] References Cited

U.S. PATENT DOCUMENTS 4,829,853  5/1989  Sakaguchi ..................... 477/125 X
4,984,485  1/1991  Kojima et al. .................. 477/116
5,074,168  12/1991  Ishikawa et al. ................ 477/126

Primary Examiner—Charles A. Marmor
Assistant Examiner—Nathan O. Jensen
Attorney, Agent, or Firm—Lorusso & Loud

[57] ABSTRACT

A shift control system is provided for an automatic transmission having, connected in series, a secondary shifting unit, capable of being shifted between a high speed stage and a low speed stage, and a primary shifting unit which provides plural speed stages including a reverse speed stage. The secondary shifting unit can be set to the high speed stage upon a shift into reverse. The shift control system is equipped with a reverse range detector for detecting a shift from neutral to reverse range, a vehicle stop detector for detecting that vehicle is stopped, and a high speed stage command device for setting the secondary shifting unit at the high speed stage when, subsequent to a shift of the primary shifting unit into reverse, the vehicle is determined by a signal from the vehicle stop detector to have substantially stopped.

14 Claims, 10 Drawing Sheets

SHIFT CONTROL SYSTEM FOR AUTOMATIC TRANSMISSION

FIELD OF THE INVENTION

This invention relates to a system for controlling shifting of an automatic transmission, and especially to a shift control system for an automatic transmission, the shift control system being constructed so that, at a predetermined speed stage, rotation of an output shaft in a direction opposite to the direction in which the associated vehicle should run at the predetermined speed stage is prevented.

DESCRIPTION OF THE RELATED ART

Prevention of rotation of an output shaft in a direction opposite to the direction in which the vehicle should run at the predetermined speed stage is known, for example, as a hill-holding function. In a snow mode in which a vehicle starts in second speed, for example, the running torque is low. If one attempts to start the vehicle from stop on an uphill, there is the potential problem that the vehicle may move backward, down the hill, due to insufficient torque. Therefore, a friction engagement device is set to prevent reverse rotation of the output shaft in second speed. A system for control of this type is disclosed in Japanese Patent Application Laid-Open (Kokai) No. SH0 62-11051.

In the case of an automatic transmission having a secondary shifting unit (for example, an overdrive unit) on the input side of a shifting unit for setting plural speed ranges including a reverse range, the secondary shifting unit may be set at the high speed stage in reverse to provide an appropriate gear ratio for the reverse range. In such a transmission, a low speed stage is set by engaging a one-way clutch and a high speed stage is set by engaging a brake (for example, the automatic transmission disclosed in Japanese Patent Application Laid-Open (Kokai) No. HEI 4-31226). In an automatic transmission of this type, setting of the secondary shifting unit in the high speed range with the one-way clutch of the secondary shifting unit engaged, in other words, setting of the reverse range in the state that the vehicle is, for example, coasting forward causes the one-way clutch to engage so that the secondary shifting unit integrally rotating as a whole is fixed by the brake. The rotation of the output shaft in an advancing direction is therefore stopped.

Shifting to the second speed in the snow mode having the above-described hill-holding function or to the reverse range in which rotation of the output shaft in the advancing direction is stopped is performed by shifting a selector lever from a neutral range to a drive range or a reverse range. When such a shift is made, the vehicle may coast rearward or forward because no torque is transmitted to the output shaft while in neutral. If the shift is to the second speed having the hill-holding function, for example while the vehicle is moving backward, down a hill, the frictional engagement device is brought into engagement so that rotation of the output shaft in the downward direction is stopped abruptly. Because the load applied to the frictional engagement device is high, a shudder or a shift shock may take place so that the riding comfort may be impaired. In the case of the automatic transmission equipped with the above-described secondary shifting unit, the vehicle may coast forward in neutral. When the automatic transmission is shifted to the reverse range in this state, rotation of the output shaft in the advancing direction is stopped abruptly so that a shift shock or a shudder may also occur, thus impairing the riding comfort in this case also.

SUMMARY OF THE INVENTION

With the foregoing in view, the present invention has as a primary object the provision of a shift control system which can prevent a shift shock or a shudder even when shifting, during coasting of a vehicle, to a speed stage at which rotation of an output shaft is stopped.

To achieve the above object, in a first embodiment of the present invention, there is provided, as illustrated in FIG. 1, a shift control system for an automatic transmission A in which a secondary shifting unit 1, capable of being shifted between a high speed stage and a low speed stage, and a primary shifting unit 2, capable of establishing one of plural speed stages including a reverse speed stage, are connected in series and the secondary shifting unit 1 can be set to the high speed stage for reverse.

The shift control system includes:

reverse range detection means 3 for detecting a shift from neutral to reverse;

vehicle stop detection means 4 for detecting a stopped state; and high speed stage command means 5 for setting said secondary shifting unit 1 at the high speed stage when, subsequent to a shift of the primary shifting unit 2 to reverse, the vehicle is determined by a signal from the vehicle stop detection means to have substantially stopped.

In a second embodiment of the present invention there is also provided, as shown in FIG. 2, a second shift control system for an automatic transmission A in which a secondary shifting unit 1 connected to an engine E and capable of being shifted to a high speed stage or a low speed stage and a primary shifting unit 2 capable of setting one of plural speed stages including a reverse speed stage are connected in series and the secondary shifting unit 1 can be set at the high speed stage upon a shift of the primary shifting unit 2 to reverse.

This second shift control system includes:

reverse range detection means 3 for detecting a shift from neutral to reverse;

engine output detection means 6 for detecting output of engine E; and high speed stage command means 7 for setting the secondary shifting unit 1 at the high speed stage when, subsequent to a shift to reverse, the engine output detected by the engine output detection means 6 is at least equal to a predetermined output.

In a third embodiment of the present invention there is also provided, as illustrated in FIG. 3, a shift control system for an automatic transmission A in which an output shaft 8 is allowed to rotate in reverse at a predetermined speed stage set in a forward range but is inhibited from rotation in the reverse direction at another speed stage set in the forward range. The shift control system of FIG. 3 includes:

forward range detection means 9 for detecting a shift from neutral to the forward range;

vehicle stop detection means 10 for detecting a stopped state; and speed stage hold command means 11 for setting the automatic transmission at the other speed stage when, subsequent to setting of the automatic transmission at the predetermined speed stage as a result of a shift to the forward range, the vehicle is determined by a signal from the vehicle stop detection means 10 to have substantially stopped.

In a fourth embodiment of the present invention there is also provided, as shown in FIG. 4, a shift control system for an automatic transmission A in which an output shaft 8 is connected to an engine E and is allowed to rotate in a reverse direction at a predetermined speed stage set in a forward range but is inhibited from rotation in the reverse direction at another speed stage in the forward range. The shift control system includes:

forward range detection means 9 for detecting a shift from neutral to the forward range;

detection means 12 for detecting output of said engine E; and speed stage hold command means 13 for setting the automatic transmission at the other speed stage when, subsequent to the setting of said automatic transmission at the predetermined speed stage as a result of a shift to the forward range, the engine output detected by the engine output detection means is at least equal to a predetermined output.

In the automatic transmission A to which the first and second embodiments of the shift control system is applied, the reverse range is set by the primary shifting unit and a reverse speed stage is obtained by setting the secondary shifting unit 1 at the high speed stage. In the shift control system of the first embodiment shifting from the neutral range to the reverse range is detected by the reverse range detection means 3 and, concurrently with the shifting, the primary shifting unit 2 is set in the reverse range. When the vehicle is determined to have substantially stopped by the signal from the vehicle stop detection means 4, the secondary shifting unit 1 is set at the high speed stage by the high speed stage command means 5. Prior to setting the reverse speed stage, the output shaft is braked against forward rotation. In other words, the high speed stage of the secondary shifting unit 1 is set to stop the vehicle. Therefore, neither shudder nor shock occurs.

According to the shift control system of the second embodiment, shifting from the neutral range to the reverse range to set the reverse speed stage is detected by the reverse range detection means 3 and, concurrently with the shifting, the primary shifting unit 2 is set in the reverse range. When engine output detected by the engine output detection means 6 is equal to or greater than the predetermined value, the secondary shifting unit 1 is set at the high speed stage by the high speed stage command means 7. The torque which rotates the output shaft 8 in the reverse direction is therefore high, so that no shudder occurs.

In the automatic transmission A to which the shift control system of the third and fourth embodiments is applied, the output shaft 8 is allowed to rotate in the reverse direction at the predetermined speed stage, which is set upon shifting to the forward range, but is prevented from rotation in the reverse direction at the other speed stage which is set upon shifting to the forward range. According to the shift control system of the third embodiment, shifting from the neutral range to the forward range is detected by the forward range detection means 9 and, concurrently with the shifting, the automatic transmission is set at the speed stage at which reverse rotation of the output shaft 8 is permitted. When the vehicle is determined to have substantially stopped by the signal from the vehicle stop detection means 10, in this case, the automatic transmission is set at the speed stage at which reverse rotation of the output shaft 8 is prevented. Prevention of reverse rotation of the output shaft 8 is therefore achieved when the vehicle has substantially stopped. Even if the vehicle is moving backward, for example, in the neutral range, the vehicle is substantially at a stop at the point in time when the output shaft 8 is locked against reverse rotation. Therefore, neither shudder nor shock occurs.

According to the shift control system of the fourth embodiment, shifting to the speed stage at which reverse rotation of the output shaft 8 is prevented, following shifting from the neutral range to the forward range, is performed when the output of the engine E detected by the engine output detection means 12 is equal to or greater than the predetermined value. The torque which rotates the output shaft 8 in the forward direction is therefore high, so that no shudder occurs.

In all embodiments of the shift control system of this invention, shifting the automatic transmission from the neutral range to the predetermined range where rotation of the output shaft in the specified direction is inhibited, is permitted only when the output shaft is rotating in the direction to be inhibited upon shifting, the vehicle is determined to have substantially stopped or the output of the engine is equal to or greater than the predetermined value. It is therefore possible to prevent shudder and shock and to maintain good riding comfort.

DETAILED DESCRIPTION OF THE INVENTION AND PREFERRED EMBODIMENT

Figure 1:
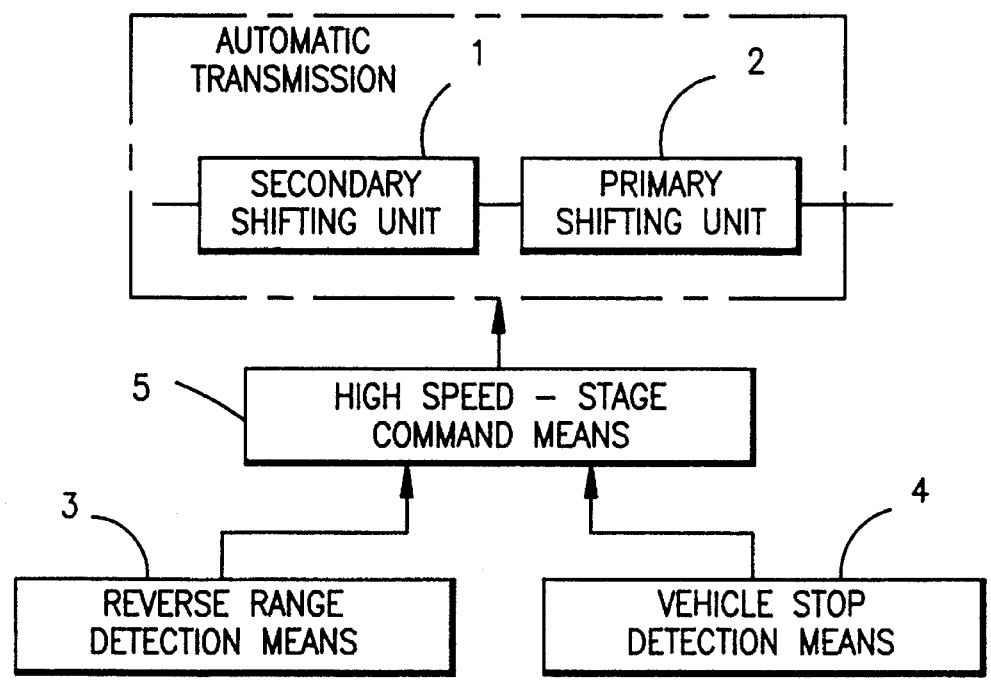
FIG. 1 is a simplified block diagram illustrating the shift control system of a first embodiment of the preset invention.
Figure 2:
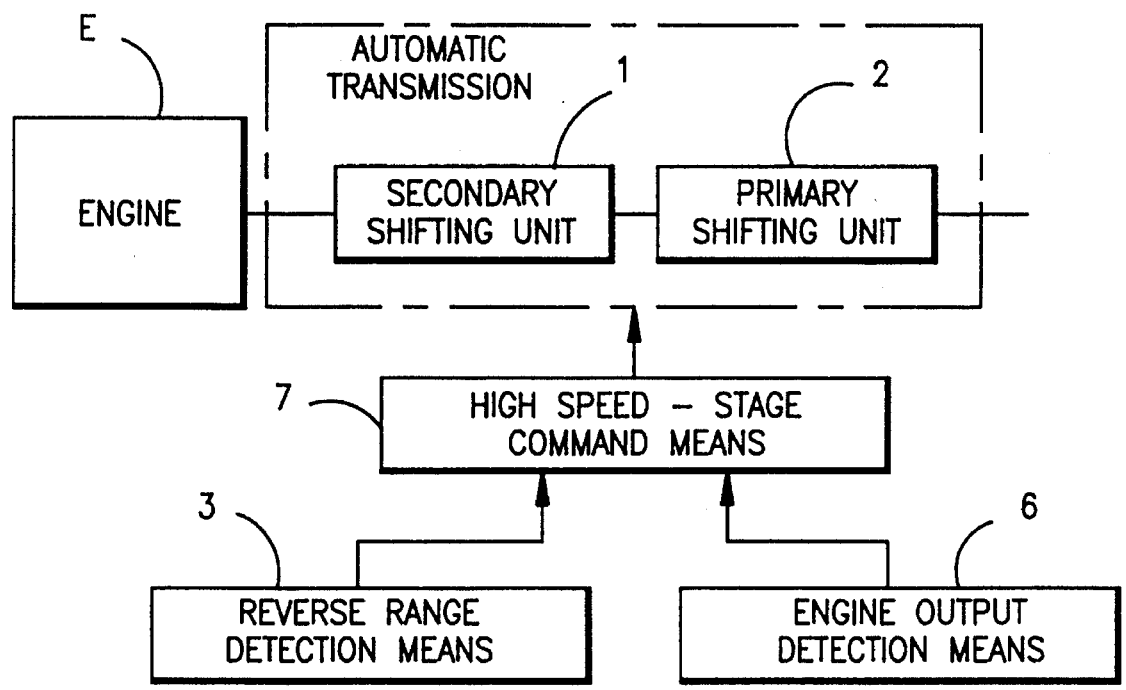
FIG. 2 is a simplified block diagram illustrating the shift control system of a second embodiment of the present invention.
Figure 3:
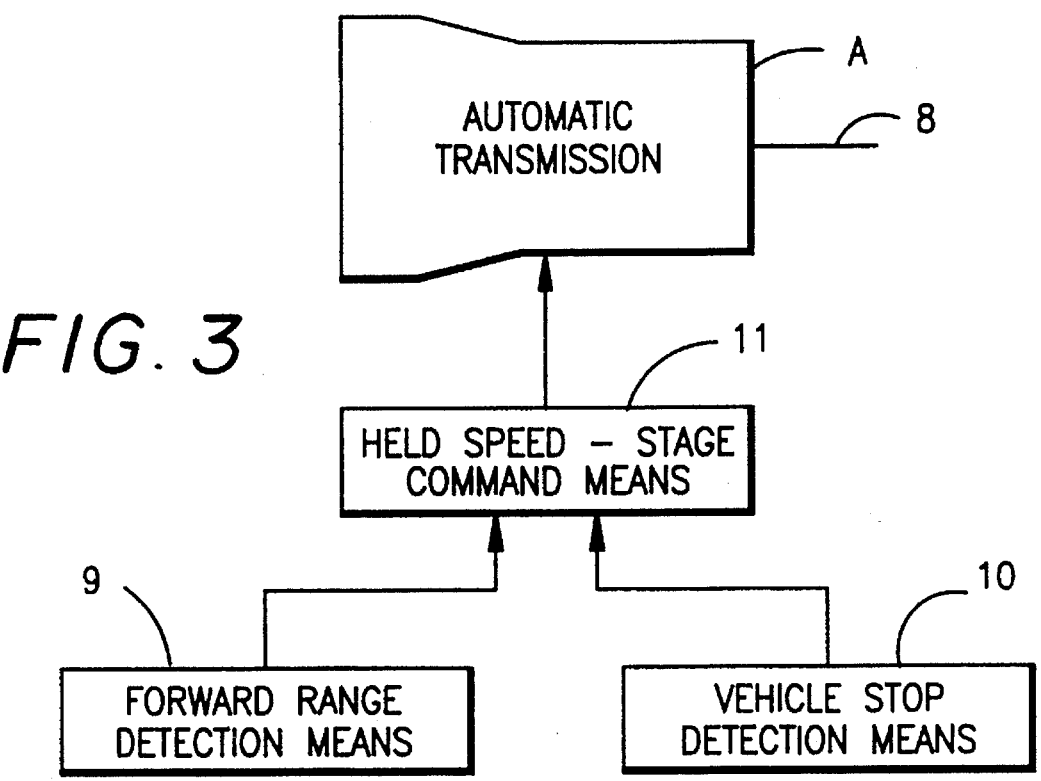
FIG. 3 is a simplified block diagram illustrating the shift control system of a third embodiment of the present invention.
Figure 4:
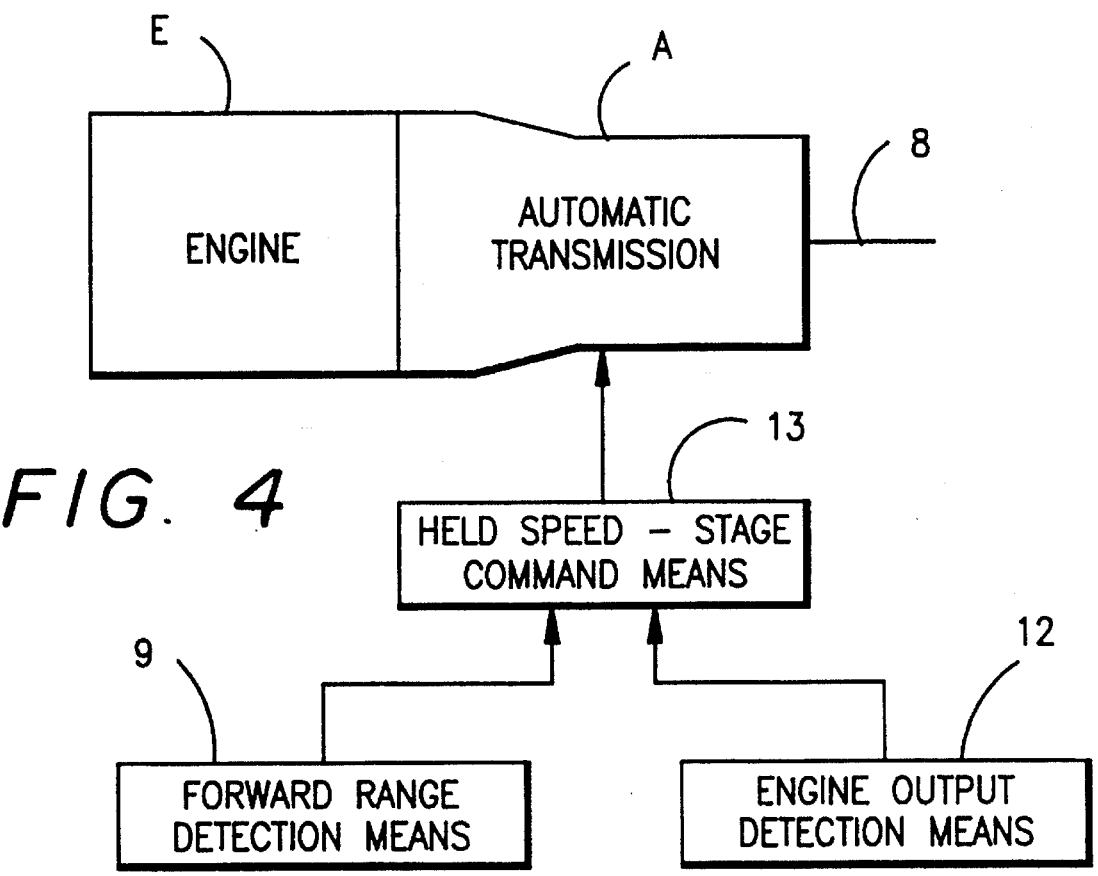
FIG. 4 is a simplified block diagram illustrating the shift control system of a fourth embodiment of the present invention.
Figure 5:
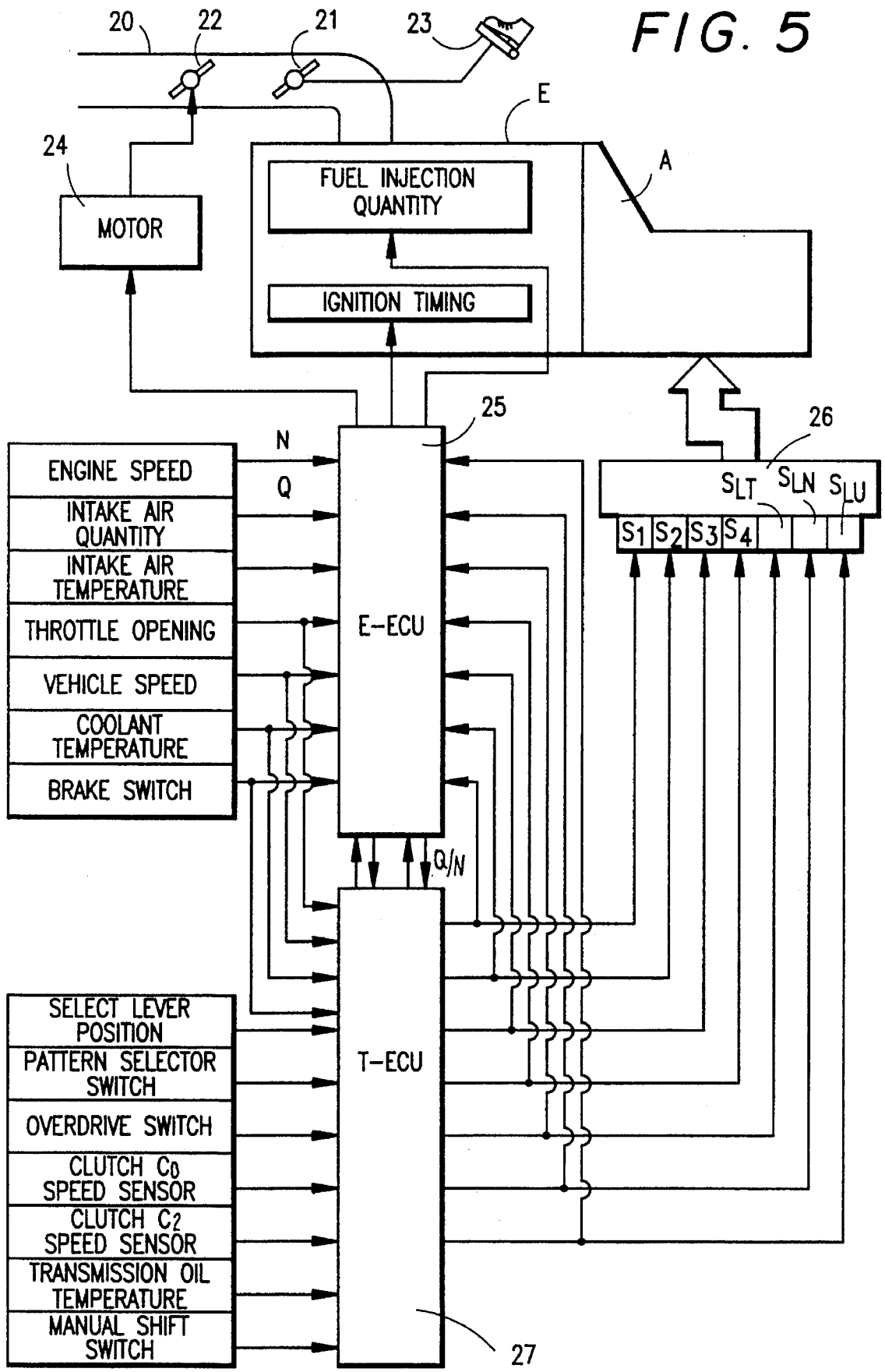
FIG. 5 is a detailed block diagram showing a control system according to one embodiment of the present invention.

Referring next to the accompanying drawings, one embodiment of the present invention will first be described with reference to FIG. 5. An engine E to which an automatic transmission A is connected has a main throttle valve 21 in an intake manifold 20 and also a subordinate (secondary) throttle valve 22 located on the upstream side of the main throttle valve 21. The main throttle valve 21 is connected to an accelerator pedal 23 and is opened or closed depending on the degree of depression of the accelerator pedal 23. The subordinate throttle valve 22, on the other hand, is opened or closed by a motor 24. An electronic engine control unit (E-ECU) 25 controls the motor 24 for adjustment of the position of the subordinate throttle valve 22 and also controls the amount of injected fuel, ignition timing and the like of the engine E. This electronic control unit is composed primarily of a central processing unit (CPU), memories (RAM,ROM) and an input/output interface. Inputted to the electronic control unit 25 are various signals as data for control, such as signals from an engine speed sensor, an intake air quantity sensor, an intake air temperature sensor, a throttle opening sensor, a vehicle speed sensor, an engine coolant temperature sensor and a brake switch.

The gear position, lockup clutch and line pressure of the automatic transmission A are controlled by a hydraulic pressure control unit 26. The hydraulic pressure control unit 26 is designed to be controlled electrically to perform shifting, and is provided with first to third shift solenoid valves S1–S3, a fourth solenoid valve S4 for controlling the state of each engine brake, a linear solenoid valve $S_{LT}$ for controlling the line pressure, a linear solenoid valve $S_{LN}$ for controlling the back pressure of an accumulator, and a linear solenoid valve $S_{LU}$ for controlling a lockup clutch.

The electronic automatic transmission control unit (T-ECU) 27 outputs signals to these solenoid valves to control shifting, the line pressure, the accumulator back pressure and the like. This electronic automatic transmission control unit 27 is composed primarily of a central processing unit (CPU), memories (RAM,ROM) and an input/output interface. Input as data to the electronic control unit 27 are signals from the throttle opening sensor, the vehicle speed sensor, the engine coolant temperature sensor and the brake switch, signals from a selector lever position sensor and a pattern select switch, a signal from an overdrive switch, a signal from a $C_0$ sensor for detecting rotational speed of a clutch $C_0$, a signal from a $C_2$ sensor for detecting rotational speed of a second clutch $C_2$, signals from a transmission oil temperature sensor and a manual shift switch, etc. The electronic automatic transmission control unit 27 and the electronic engine control unit 25 are connected together to permit data communication therebetween. The electronic engine control unit 25 transmits, signals such as a signal indicating intake air quantity per revolution (Q/N) to the electronic automatic transmission control unit 27. The electronic automatic transmission control unit 27, on the other hand, transmits signals equivalent to command signals to the respective solenoid valves and signals commanding a speed stage, and the like are transmitted to the electronic engine control unit 25.

The electronic automatic transmission control unit 27 determines a speed stage, the ON/OFF state of the lockup clutch, the regulated level of the line pressure, etc. on the basis of inputted data and, based on the results of the determination, outputs command signals to the corresponding solenoid valves. It also determines if a failure has occurred and, based on that determination, controls the failure. The electronic engine control unit 25, on the other hand, controls the amount of fuel to be injected, the ignition timing, the position of the subordinate throttle valve 22 and the like on the basis of the inputted data and, upon shifting the automatic transmission A, also reduces the amount of fuel injected, changes the ignition timing or changes the position of the subordinate throttle valve 22 to a smaller opening to temporarily reduce the output torque.

Figures 6, 7:
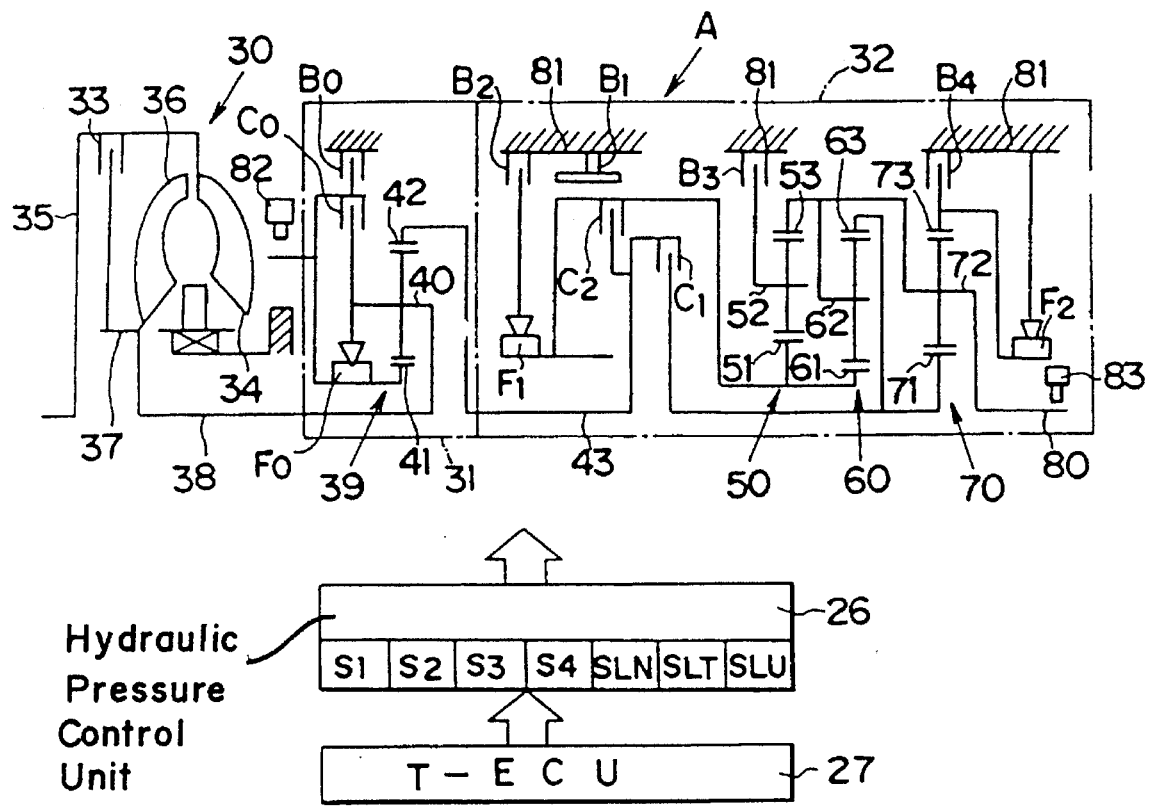
FIG. 6 is a schematic diagram depicting a gear train of an automatic transmission to which the shift control system of FIG. 5 is applied.
FIG. 7 is a table showing engagement of friction engagement devices at respective speed stages.

FIG. 6 illustrates one example of a gear train for the automatic transmission A. The illustrated gear train provides 5-forward/1-reverse speed stages and includes a torque converter 30, a secondary shifting unit 31 and a primary shifting unit 32. The torque converter 30 has a lockup clutch 33, which is disposed between a front cover 35 integrated with a pump impeller 34 and a member (hub) 31 integral with turbine runner 36. An engine crankshaft (not shown) is connected to the front cover 35. An input shaft 38, to which the turbine runner 36 is connected, is in turn connected to a carrier 40 of an overdrive planetary gear mechanism 39 which is part of the secondary shifting unit 1.

A multi-plate clutch $C_0$ and a one-way clutch $F_0$ are arranged between the carrier 40 and a sun gear 41 in the planetary gear mechanism 49. Incidentally, this one-way clutch $F_o$ is designed to engage when the sun gear 41 undergoes normal rotation relative to the carrier 40 (i.e., rotation in the direction of rotation of the input shaft 38). Also provided is a multi-plate brake $B_0$ for selectively stopping rotation of the sun gear 41. A ring gear 42, which is an output element of the secondary shifting unit 31, is connected to an intermediate shaft 43 as an input element of the primary shifting unit 32.

When the multi-plate clutch $C_0$ or the one-way clutch $F_0$ is engaged, the planetary gear mechanism 39 integrally rotates as a whole. The intermediate shaft 43 therefore rotates at the same speed as input shaft 38, whereby the secondary shifting unit 31 is set at a low speed stage. When the brake $B_0$ is engaged, and rotation of the sun gear 41 is thereby stopped, on the other hand, the ring gear 42 is rotated at a higher speed in a normal direction relative to the input shaft 38 so that a high speed stage is established.

The primary shifting unit 32, on the other hand, is provided with three sets of planetary gear mechanisms 50,60,70. Their rotary elements are connected as will be described hereinafter. Namely, a sun gear 51 of the first planetary gear mechanism 50 and a sun gear 61 of the second planetary gear mechanism 60 are integrally connected to each other. Further, three elements, that is, a ring gear 53 of the first planetary gear mechanism 50, a carrier 62 of the second planetary gear mechanism 60 and a carrier 72 of the third planetary gear mechanism 70 are connected together. Connected to the carrier 72 is an output shaft 80. In addition, a ring gear 63 of the second planetary gear mechanism 60 is connected to a sun gear 71 of the third planetary gear mechanism 70.

The gear train of the main shifting unit 32 permits establishment of one reverse speed stage and four forward speed stages. To this end, clutches and brakes are arranged as will be described hereinafter. Describing the clutches first, a first clutch $C_1$ is arranged between the ring gear 63 of the second planetary gear mechanism 60 and the sun gear 71 of the third planetary gear mechanism 70, the ring gear 63 and the sun gear 71 being connected together, and the intermediate shaft 43, and a second clutch $C_2$ is disposed between (1) the sun gear 51 of the first planetary gear mechanism 50 and the sun gear 61 of the second planetary gear mechanism 60, which are connected together, and (2) the intermediate shaft 43.

The brakes will now be described. A first brake $B_1$ is a band brake and is arranged to stop rotation of the sun gears 51,61 of the first and second planetary gear mechanism 50,60. Between these sun gears 51,61 (both mounted on a common sun gear shaft) and casing 81, a first one-way clutch $F_1$ and a second brake $B_2$ in the form of a multi-plate brake are arranged in series. The first one-way clutch $F_1$ is designed to engage when the sun gears 41,51 attempt reverse rotation (i.e., rotation in a direction opposite to the direction of rotation of the input shaft 38). A third brake $B_3$ in the form of a multi-plate brake is disposed between a carrier 52 of the first planetary mechanism 50 and the casing 81. A fourth brake $B_4$, in the form of a multi-plate brake, and a second one-way clutch $F_2$ are arranged in parallel between the carrier 72 and the casing 81 for stopping rotation of a ring gear 73 of the third planetary gear mechanism 70. The second one-way clutch $F_2$ is designed to engage when the ring gear 73 attempts reverse rotation.

The clutch $C_0$ of the secondary shifting unit 31 is provided with a $C_0$ sensor 82 for detecting its rotational speed and the output shaft 80 is provided with a vehicle speed sensor 83 for detecting its rotational speed.

In the above-described automatic transmission A, the 5-forward/1-reverse speed stages can be selectively established by engaging or releasing the corresponding clutches and brakes as shown in the gear shift pattern of FIG. 7, in which the mark ○ indicates "engaged", the mark ● indicates "engaged upon application of an engine brake", the mark △ indicates either "engaged" or "released", and a blank indicates "released". As can be appreciated from FIGS. 6 and 7, the above-described automatic transmission A exhibits, at speed stages of the second speed and higher, a hill-holding function whereby, when a vehicle is at a stop facing uphill, the vehicle is inhibited from moving rearward, in other words, the output shaft 80 is braked against reverse rotation.

Figure 8:
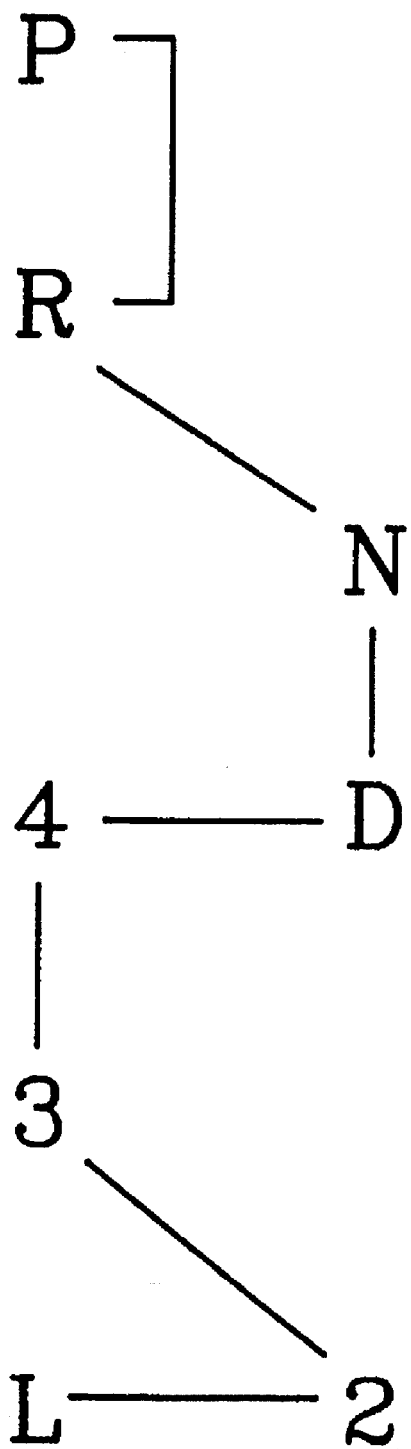
FIG. 8 illustrates a pattern of range positions which are selected by a selector lever.

In the above-described automatic transmission A, one of plural ranges including a reverse range, is selected by a selector lever (not illustrated). The positions of these ranges are arranged as shown in FIG. 8. These range positions are connected together by a guide groove for the selector lever.

Figure 9:
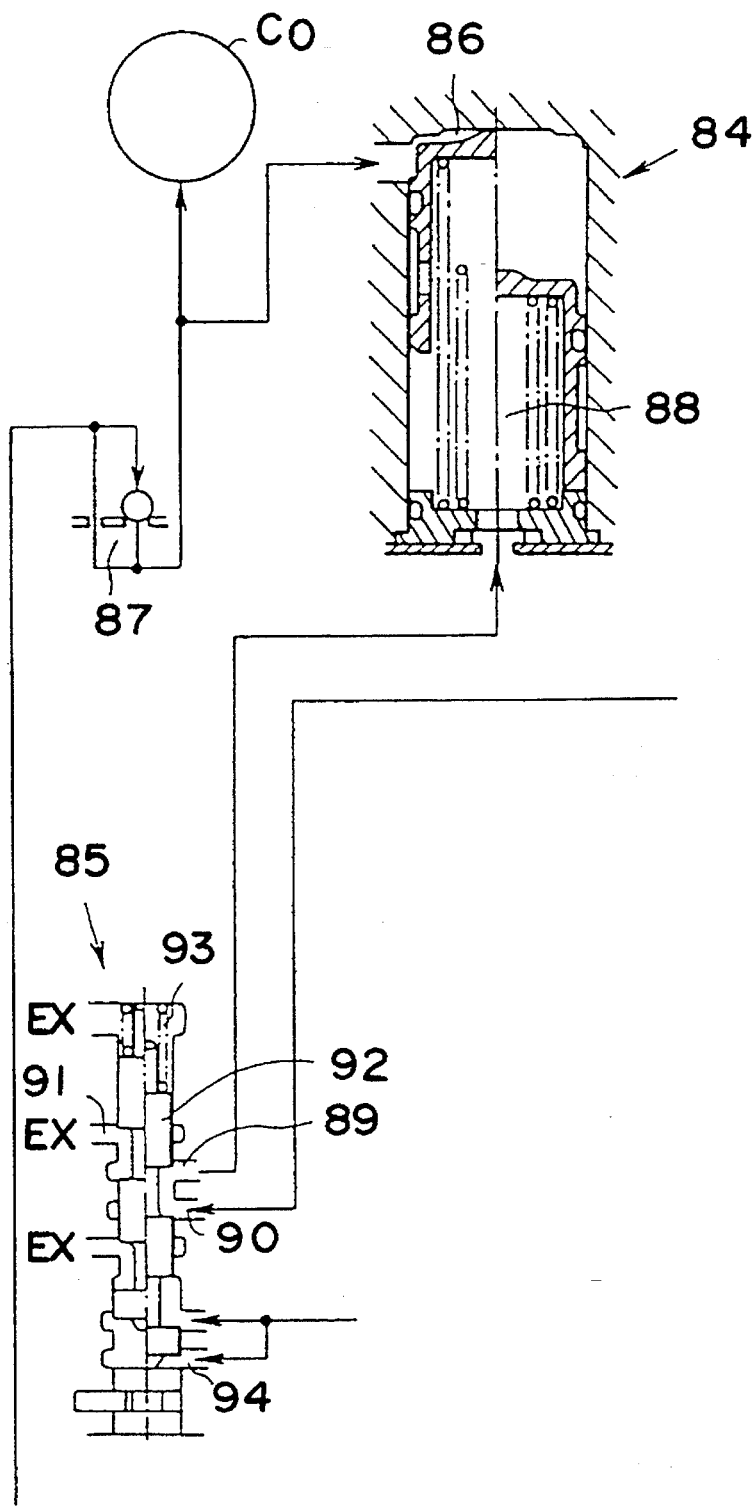
FIG. 9 is a fragmentary hydraulic circuit showing a cut-off valve which controls the back pressure of an accumulator for a clutch in a secondary shifting unit.

Of the friction engagement devices shown in FIG. 6, the clutch $C_0$ and the brake $B_0$ in the secondary shifting unit 31 and the second clutch $C_2$ in the primary shifting unit 32 are each provided with an accumulator which controls the back pressure of the associated friction engagement device. A cut-off valve (back pressure control valve) 85 is connected to a back pressure compartment of an accumulator 84 for the clutch $C_0$. FIG. 9 illustrates the construction of the cut-off valve. A positive pressure compartment 86 of the accumulator 84 is connected to a line which extends between hydraulic servomotor C-O for clutch $C_0$ and an orifice 87 equipped with a check ball. Further, a back pressure compartment 88 of the accumulator 84 is connected to an output port 89 of the cut-off valve 85.

The cut-off valve 85 selectively connects its output port 89 to an input port 90 or a drain port 91, and a control port 94, to which a throttle pressure is fed, is provided opposite a spring 93 with a spool 92 interposed therebetween. By feeding a throttle pressure to the control port 94, the spool 92 is lifted upward as viewed in FIG. 9 so that the output port 89 communicates with the drain port 91. Where no throttle pressure is applied to the control port 94, conversely, the spool 92 moves to the lower position in FIG. 9 so that the output port 89 communicates witch the input port 90.

Upon shift to a reverse speed range in the above-described automatic transmission A, the secondary shifting unit 31 is brought into an overdrive state to provide an appropriate gear ratio. The secondary shifting unit 31 then integrally rotates as a whole with the one-way clutch $F_0$ engaged.

Engagement of the brake $B_0$ in this state would stop rotation of the secondary shifting unit 31, which is rotating as an integral unit, and produce a shock. The secondary shifting unit 31 is therefore controlled as shown in FIG. 10 or FIG. 11 when the automatic transmission is changed over from the neutral range to the reverse range.

Figure 10:
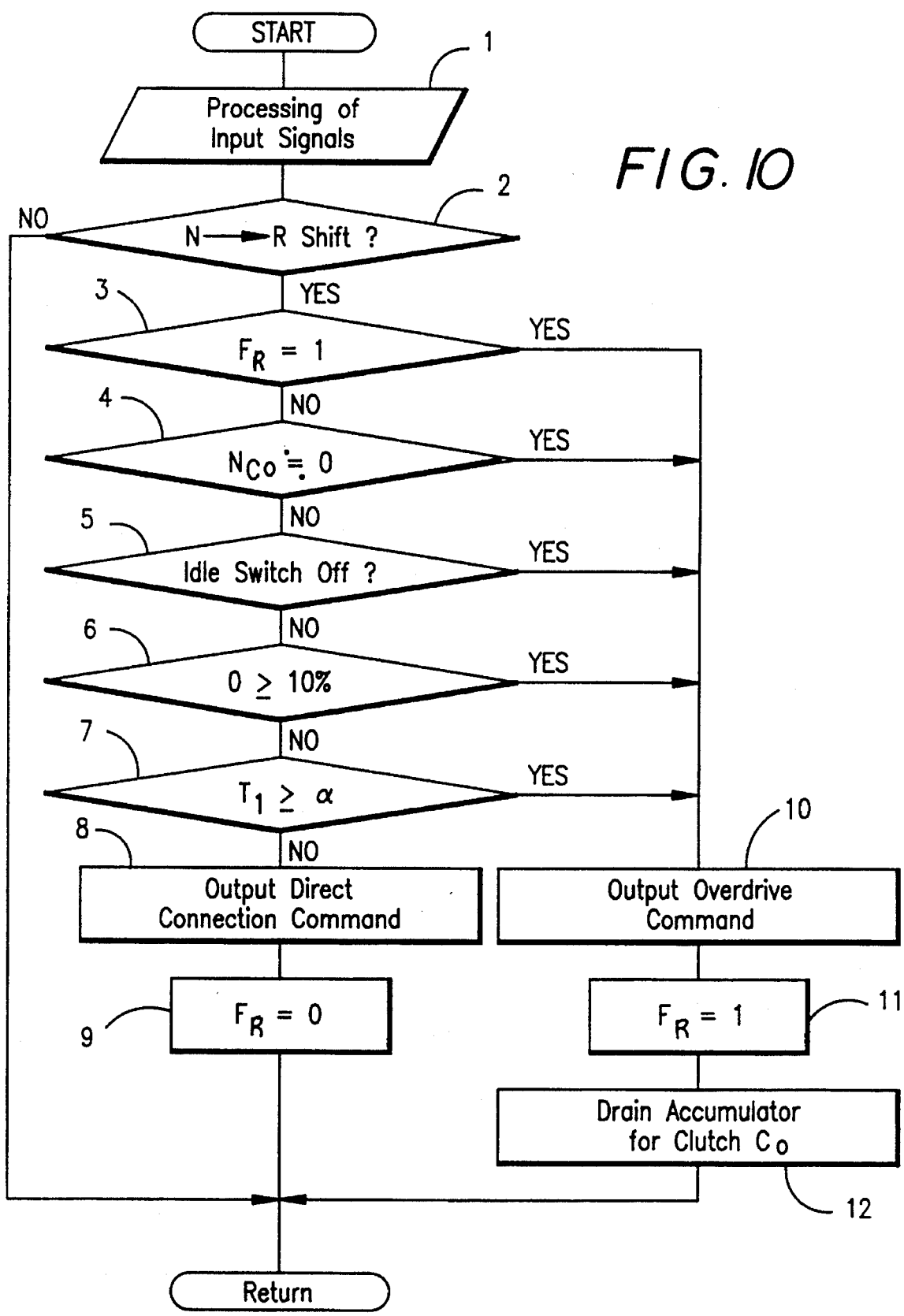
FIG. 10 is a flow chart illustrating one example of a control routine to be executed upon shifting from a neutral range to a reverse range.
Figure 11:
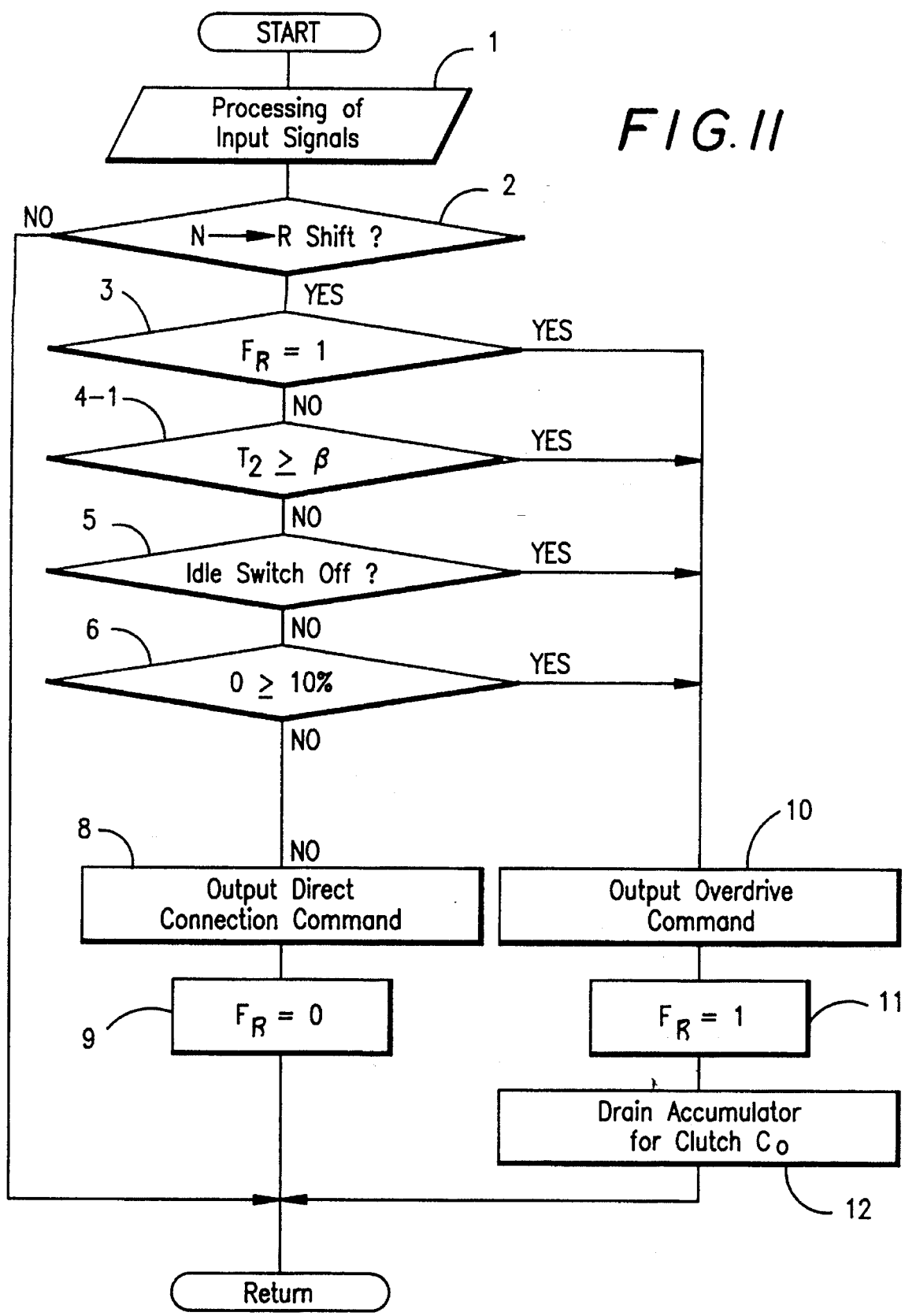
FIG. 11 is a flow chart showing another example of a control routine to be executed upon shifting from the neutral range to the reverse range.

In FIG. 10, it is determined, subsequent to processing of input signals (step 1), whether or not a change from the neutral range to the reverse range has occurred (step 2). If this operation has not yet occurred, the routine returns. If the change has already been effected, it is next determined whether or not flag FR has been set at "1" (step 3). Setting of flag FR at "1" indicates that the secondary shifting unit 31 is in overdrive. If flag FR is not "1", in other words, if the result of the determination is "NO", it is then determined whether or not the input rotational speed, in other words, the rotational speed $N_{co}$ of the clutch $C_0$ is lower than a predetermined value (for example, approximately "0") (step 4). In other words, step 4 determines whether or not a vehicle has substantially stopped. If the result of the determination is "NO", in other words the vehicle has not substantially stopped, it is next determined whether or not an idle switch is off (step 5).

In other words, step 5 determines whether or not an output is produced from the engine E. If the result of the determination is "NO", in other words if the accelerator pedal has not been depressed and the engine E is in an idling state, it is next determined in step 6 whether or not the throttle opening θ is equal to or greater than a predetermined opening (for example 10%). Step 6 also determines whether or not an engine output is produced to a certain extent. Accordingly, this step serves as a backup when the idle switch is in fault.

If the determination in step 6 is "NO", it is then determined whether or not the counted time of a timer $T_1$ equals or exceeds a predetermined time α (step 7). Although the behavior of the vehicle can be determined in step 4, no data can be obtained if the corresponding sensor should fail and, accordingly, step 7 is provided as a backup for the occurrence of such a fault. Upon the timer $T_1$ reaching the predetermined time α, a decision is made for changing of the secondary shifting unit 31. In other words, the timer $T_1$ functions as a so-called guard timer.

If the time counted by the timer $T_1$ has not reached the predetermined time α, i.e. if the result of the determination in step 7 is "NO", a command signal is output to bring the secondary shifting unit 31 into a directly connected state (step 8) and at the same time, flag FR is set at "0", and the routine then returns.

Even if the primary shifting unit 32 is changed over into a reverse state as a result of shifting to the reverse range, the secondary shifting unit 31 is set at the low speed stage, that is, in the directly connected state, to permit forward rotation of the output shaft 80, provided that the input revolution speed $N_{co}$ is higher than a predetermined value for reasons such that the vehicle is still coasting forward. This applies equally when there is no engine output. As a result, the possibility of a forceful stop of the output shaft 80 is avoided and neither shudder nor shock therefore occurs.

On the other hand, if flag FR has been set at "1" and the determination in step 3 is "YES", if the determination in step 4 is "YES" as the input rotational speed $N_{co}$ is approximately "0", if the determination in step 5 is "YES" as the idle switch is off, if the determination in step 6 is "YES" as the throttle opening θ is 10% or greater, or if the elapsed time counted by the timer $T_1$ has reached the predetermined time α or longer and the determination n step 7 is "YES", a command signal is outputted to change the secondary shifting unit 31 over into the overdrive state (step 10). Further, flag FR is set at "1" (step 11), and the accumulator 84 of the clutch $C_0$ is inactivated, in other words, its back pressure compartment is brought into communication with the drain port by the cut-off valve 85 (step 12).

Overdrive for the secondary shifting unit 31 is achieved by engaging the brake $B_0$ to fix sun gear 41. Even if the clutch $C_0$ of the secondary shifting unit 31 is brought into engagement, for example, while the vehicle is still coasting forward, the fixing of the sun gear 41 by the brake $B_0$ does not cause shudder due to slipping of the fourth brake $B_4$ kept in engagement to set a reverse speed stage. Further, no shock so large as to impair riding comfort occurs because the input rotational speed $N_{c0}$ is low, practically "0". Even if the input rotational speed $N_{c0}$ is not practically "0", a reverse speed stage can still be attained without causing a shudder or shock when an engine output of at least a certain degree is produced, because a large torque is transmitted from the engine E to the sun gears 51,61 of the first and second planetary gear mechanisms 50,60 in the primary shifting unit 32 and the rotational speeds of these sun gears 51,61 are hence raised.

To place the secondary shifting unit in overdrive, it is necessary to release the clutch $C_0$ and at the same time to engage the brake $B_0$. Since the back pressure compartment 88 of the accumulator 84 connected to the clutch $C_0$ communicates with the drain port via the cut-off valve 85, no oil flows into the back pressure compartment 88 even if the piston of the accumulator 84 is returned by the spring. No reduction therefore occurs in the line pressure, thereby making it possible to maintain the engagement of the fourth brake $B_4$ which is engaged for a reverse speed stage. As a result, it is possible to effectively prevent shudder.

Upon changing over from the neutral range to the reverse range, the primary shifting unit 31 is first set in the reverse range. Even if the vehicle is coasting forward, for example, the vehicle eventually changes from a stopped state to a rearwardly-moving state. In the example shown in FIG. 10, the secondary shifting unit 31 is changed over to overdrive after a delay until the input rotational speed $N_{c0}$ drops substantially to "0" subsequent to the change-over to reverse. As the input rotational speed $N_{c0}$ drops substantially to "0" as time goes on, it is possible to control the change-over of the secondary shifting unit 31 to the overdrive on the basis of the elapsed time without relying upon the input rotational speed $N_{c0}$.

One example of such control is illustrated in FIG. 11. In the illustrated example, instead of determination of input rotational speed $N_{c0}$, a decision is made whether or not the elapsed time counted by a timer $T_2$ has reached a predetermined time β (<α) or longer (step 4-1). The above-described backup by the timer $T_1$ in step 7 is omitted here. Although this predetermined time β may be a fixed value, it may be a value which varies with the vehicle speed, the engine speed, the oil temperature or the on/off state of the brake switch, to reduce shock. The control illustrated by way of example in FIG. 11 can also prevent a shudder or a shock for reasons similar to those previously stated in connection with the control depicted in FIG. 10.

The above-described examples are examples of control in a reverse speed stage at which reverse rotation of the output shaft 80 is prevented, in other words, a reverse speed stage at which the secondary shifting unit 31 is set in overdrive stage while the vehicle is moving forward under inertia or the like. Similar control can be performed upon setting a speed stage with the so-called hill-holding function.

When starting on a snow-covered road whose surface has a small coefficient of friction (μ), a snow mode may be set to start at the second speed with a view toward avoiding slip. The above-described automatic transmission A has the hill-holding function at a speed stage of second speed or higher. At the second speed, for example, the third brake $B_3$ is engaged so that the output shaft 80 is inhibited from reverse rotation. If the vehicle moves rearward on an uphill when the selector lever has been moved from the neutral range to the drive range, reverse rotation of the output shaft 80 is abruptly prevented so that a shudder or a shock may occur. To eliminate such an inconvenience, the automatic transmission is controlled as illustrated in FIG. 12 or FIG. 13.

Figure 12:
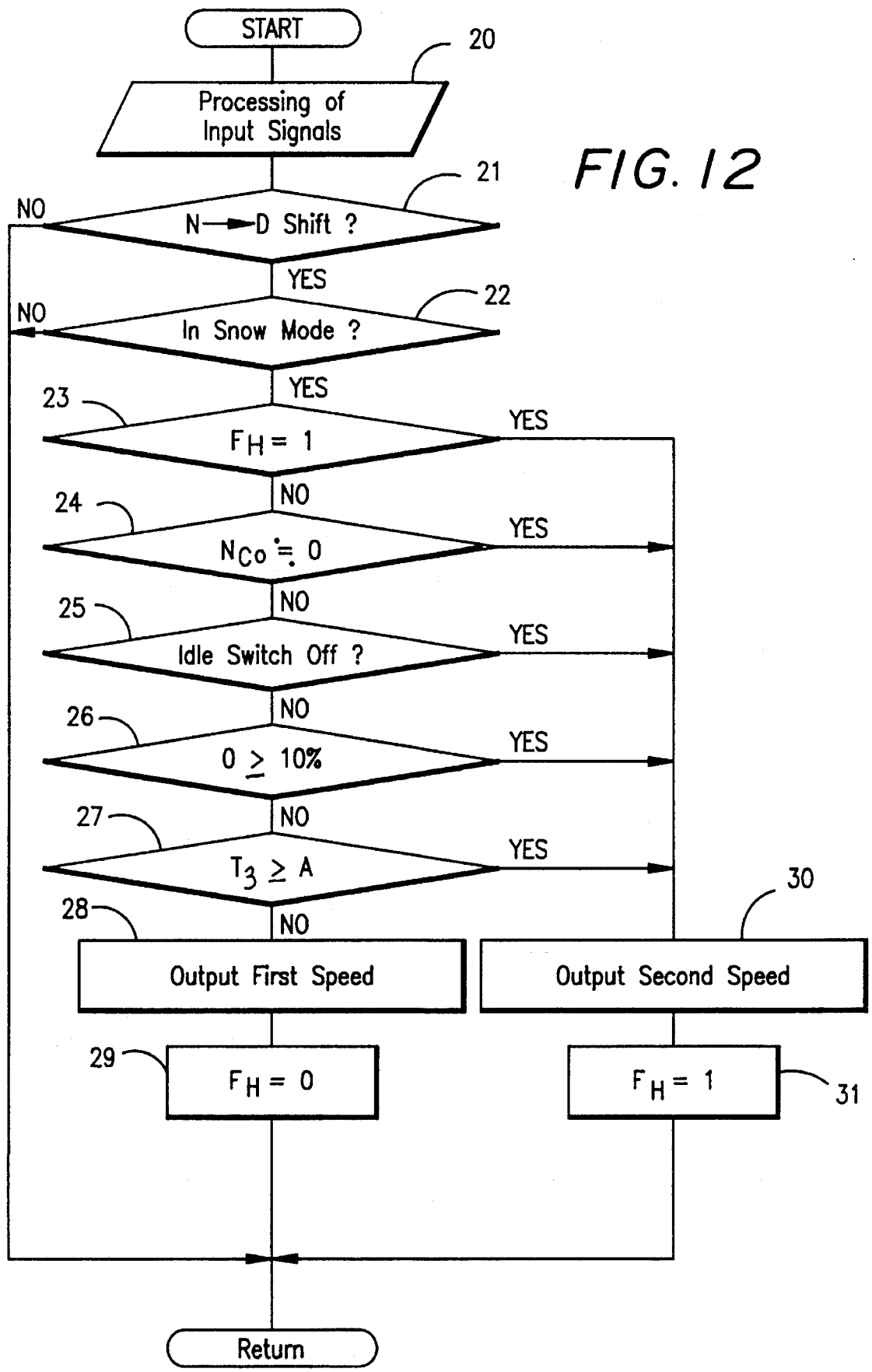
FIG. 12 is a flow chart depicting one example of a control routine to be executed upon shifting from the neutral range to a drive range in a snow mode.
Figure 13:
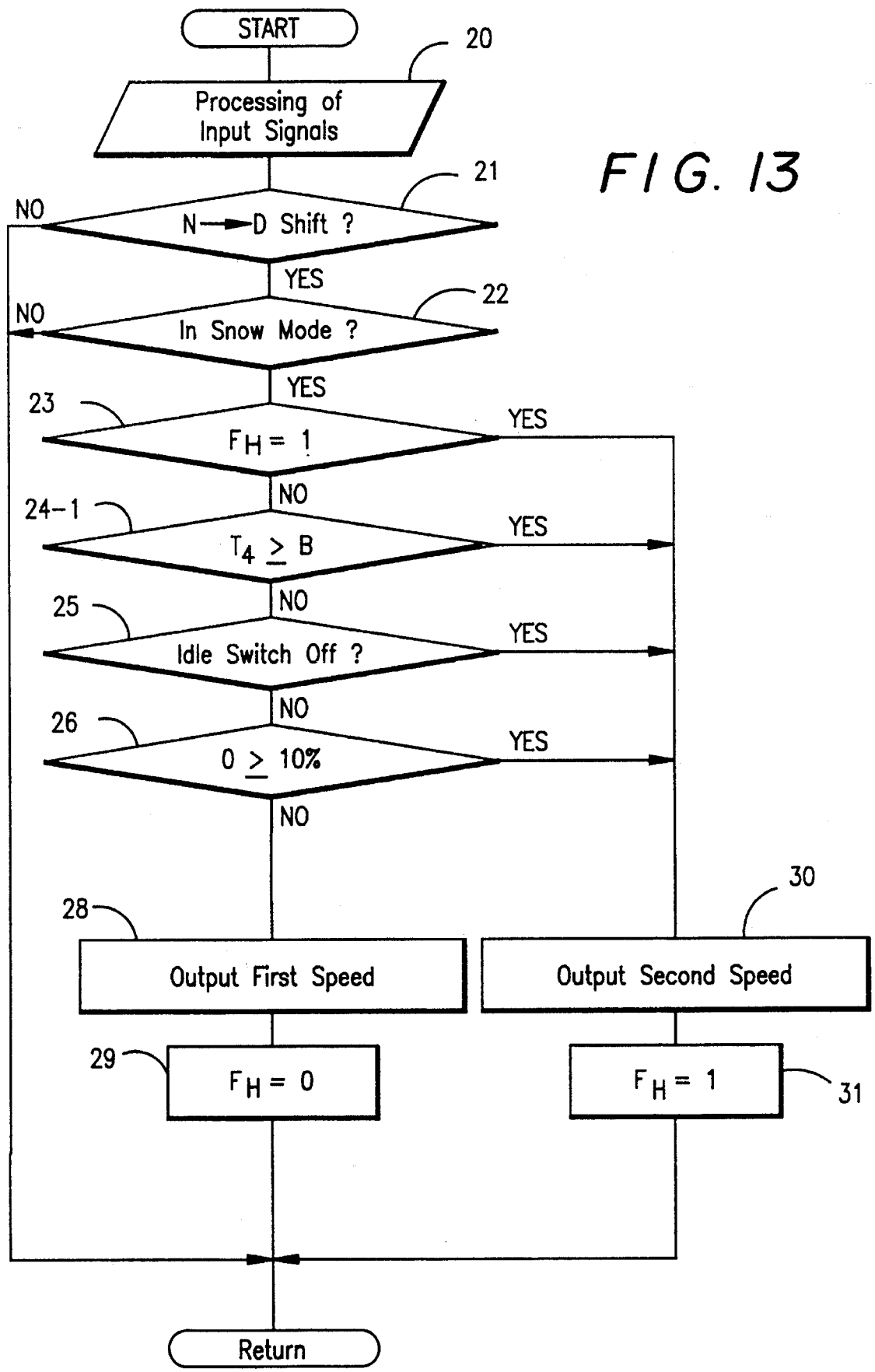
FIG. 13 is a flow chart illustrating another example of a control routine to be executed upon shifting from the neutral range to the drive range in the snow mode.

Referring to FIG. 12, subsequent to processing of input signals (step 20), it is determined whether or not the change-over from the neutral range to the drive range (N→D) has occurred (step 21). If this change-over has not yet occurred, the routine returns. Conversely, if the changeover has occurred it is determined whether or not the snow mode has been selected (step 22). If not in the snow mode, the routine returns. If the snow mode has been selected, it is then determined whether or not flag FH has been set at "1" (step 23). Setting of flag FH at "1" indicates that the second speed has been set in the snow mode. If flag FH is found to have been set at "1" in step 23, it is then determined whether or not the input rotational speed, i.e. the rotational speed $N_{c0}$ of the clutch $C_0$, is equal to or lower than a predetermined value (for example, approximately "0") (step 24). Thus, this step determines whether or not the vehicle has substantially stopped. If the result of the determination is "NO", in other words, the vehicle has not substantially stopped, it is next determined whether or not the idle switch is off (step 25).

This step determines whether or not an output is produced from the engine E. If the result of the determination is "NO", in other words, if the accelerator pedal has not been depressed and the engine E is in an idling state, it is next determined whether or not the throttle opening θ is equal to or greater than a predetermined opening (for example 10%) (step 26). This step also determines whether or not an engine output is produced to a certain extent. Accordingly, this step serves as a backup when the idle switch is in fault.

If the determination of step 26 is "NO", it is then determined whether or not the elapsed time counted by a timer $T_3$ has reached a predetermined time A or longer (step 27). Although the behavior of the vehicle can be determined in step 24, no data can be obtained if the corresponding sensor should fail and, therefore, step 27 is provided as a backup against the occurrence of such a fault. Upon reaching the predetermined time A by the timer $T_3$ a determination is made as to shifting to the second speed. In other words, the timer $T_3$ functions as a so-called guard timer.

If the time counted by the timer $T_3$ has not reached the predetermined time A, i.e. if the result of the determination in step 27 is "NO", a shift command signal is output to set the first speed, even in the case of a start-up in the snow mode, and at the same time, flag FH is set at "0", and the routine then returns.

Even in the snow mode in which the speed stage at the time of a start-up is set at the second speed, the automatic transmission is set at the first speed without any hill-holding function to permit reverse rotation of the output shaft 80, provided that the input rotational speed $N_{c0}$ is higher than a predetermined value for reasons such that the vehicle is moving rearward. This applies equally when no engine output is produced. As a result, it is possible to avoid a situation wherein the output shaft 80 is forced to stop and, therefore, neither shudder nor shock occurs.

On the other hand, if flag FR has been set at "1" and the determination in step 22 is "YES", if the determination in step 24 is "YES" meaning that the input rotational speed $N_{co}$ is approximately "0", if the determination in step 25 is "YES" as the idle switch is off, if the determination in step 26 is "YES" meaning that the throttle opening θ is 10% or greater, or if the elapsed time counted of the timer $T_3$ has reached the predetermined time A or longer and the determination in step 27 is "YES", a command signal is output to set the second speed with the hill-holding function (step 30) and at the same time, flag FH is set at "1" (step 31).

Second speed in the snow mode has the hill-holding function which inhibits reverse rotation of the output shaft 80. Upon setting this second speed in association with change-over from the neutral range to the drive range, no excess load is applied to the corresponding friction engagement devices even if the vehicle is moving rearward on an uphill, because the input revolution speed $N_{co}$ is as low as approximately "0". Therefore, neither a shudder nor a shock of such an extent as to impair riding comfort occurs. Even if the input rotational speed $N_{co}$ is not practically "0", it is still possible to avoid a shudder or a shock, insofar as an engine output of at least a certain degree is produced, because a large torque is transmitted from engine E to the ring gear 63 of second planetary gear mechanism 60 and the sun gear 71 of third planetary mechanism 70 in the primary shifting unit 32 and the rotational speeds of ring gear 63 and sun gear 71 are thereby raised.

When the selector lever is moved from the neutral range to the drive range in the snow mode, the automatic transmission is set at the first speed according to the above control unless the condition for establishing the second speed having the hill-holding function is met. If the vehicle is moving rearward on an uphill in this case, first speed causes the vehicle to gradually stop or the accelerator pedal is depressed to stop the vehicle. Accordingly, the condition for establishing the second speed will be met as time progresses. As a condition for setting the second speed in the snow mode, it is therefore possible to employ the lapse of a predetermined time in place of the condition that the input rotational speed $N_{co}$ is substantially "0".

One example of such control is illustrated in FIG. 13. In the illustrated example, instead of determining the input rotational speed $N_{co}$, a determination is made as to whether or not the elapsed time counted by a timer $T_4$ has reached a predetermined time B (<A) or longer (step 24-1). The above-described backup by the timer $T_3$ in step 27 is omitted here. Although this predetermined time B may be a fixed value, it may, in the alternative, be a value which varies depending on the vehicle speed, the engine speed, the oil temperature or the on/off state of the brake switch, to reduce shock. The control illustrated by way of example in FIG. 13 can also prevent a shudder or shock for reasons similar to those previously explained in connection with the control scheme depicted in FIG. 12.

It should be borne in mind that the present invention is not limited to the embodiments described above. For example, the present invention can be practiced on an automatic transmission equipped with a control system and a gear train other than the control system shown in FIG. 5 and the gear train depicted in FIG. 6.

We claim:

1. A shift control system for an automatic transmission in a vehicle, the automatic transmission including, connected in series, a secondary shifting unit having a high speed stage and a low speed stage and a primary shifting unit providing plural speed stages including neutral and a reverse speed stage, wherein the secondary shifting unit can be shifted to the high speed stage upon establishing the reverse speed stage, said shift control system comprising:

reverse detection means for detecting a shift from neutral to the reverse speed stage;

vehicle stop detection means for detecting whether or not the vehicle is substantially stopped; and high speed stage command means for establishing the high speed stage in said secondary shifting unit when, subsequent to a shift of the primary shifting unit to the reverse speed stage, the vehicle is determined by a signal from said vehicle stop detection means to have substantially stopped.

2. A shift control system according to claim 1, wherein said vehicle stop detection means detects input rotational speed to the automatic transmission; and, when the input rotational speed detected by said input rotational speed detection means is not higher than a predetermined rotational speed, said high speed stage command means determines that said vehicle has substantially stopped and establishes the high speed stage in the secondary shifting unit.

3. A shift control system according to claim 1, wherein said shift control system further comprises:

timer means for counting time elapsed from detection of a shift to the reverse speed stage by said reverse detection means; and wherein, when the elapsed time counted by the timer means is at least equal to a predetermined time or when the vehicle is determined by a signal from said vehicle stop detection means to have substantially stopped, said high speed stage command means establishes the high speed stage in said secondary shifting unit.

4. A shift control system according to claim 1, wherein said secondary shifting unit comprises:

a multi-plate clutch which is released at the high speed stage;

a back pressure control valve;

a hydraulic servomotor, which engages or releases the multi-plate clutch in accordance with the feeding or draining of a hydraulic pressure; and an accumulator for controlling the feeding and draining of the hydraulic pressure to said servomotor, said accumulator having a positive pressure compartment and a back pressure compartment, said positive pressure compartment communicating with said hydraulic servomotor and said back pressure compartment communicating with said back pressure control valve for controlling the hydraulic pressure in said back pressure compartment, said back pressure control valve connecting said back pressure compartment to a drain line responsive to the releasing of said multi-plate clutch.

5. A shift control system for an automatic transmission in a vehicle powered by an engine, the automatic transmission including, connected in series, a secondary shifting unit, connected to the engine and having a high speed stage and a low speed stage, and a primary shifting unit providing plural speed stages including neutral and a reverse speed stage, wherein the secondary shifting unit can be shifted to the high speed stage upon establishing the reverse speed stage, said shift control system comprising:

reverse range detection means for detecting a shift from neutral to the reverse speed stage;

means for detecting output of the engine; and high speed stage command means for shifting said secondary shifting unit to the high speed stage when, subsequent to a shift of the primary shifting unit to the reverse speed stage, engine output detected by said engine output detection means is at least equal to a predetermined value.

6. A shift control system according to claim 5, wherein said engine output detection means is means for detecting throttle opening; and wherein, when the throttle opening detected by said throttle opening detection means is at least equal to a predetermined value, said high speed stage command means shifts said secondary shifting unit to the high speed stage.

7. A shift control system according to claim 5, wherein said shift control system further comprises:

timer means for counting time elapsed from detection of a shift to the reverse speed by said reverse range detection means; and wherein, when the elapsed time counted by the timer means is at least equal to a predetermined time or when the engine output detected by said engine output detection means is at least equal to a predetermined output, said high speed stage command means sets shifts the secondary shifting unit to the high speed stage.

8. A shift control system according to claim 5, wherein said secondary shifting unit comprises:

a multi-plate clutch which is released at the high speed stage;

a back pressure control valve;

a hydraulic servomotor, which engages or releases the multi-plate clutch in accordance with the feeding or draining of a hydraulic pressure; and an accumulator for controlling feeding and draining of the hydraulic pressure to said servomotor, said accumulator having a positive pressure compartment and a back pressure compartment, said positive pressure compartment communicating with said hydraulic servomotor and said back pressure compartment communicating with said back pressure control valve for controlling the hydraulic pressure in said back pressure compartment, and said back pressure control valve connecting said back pressure compartment to a drain line responsive to the releasing of said multi-plate clutch.

9. A shift control system for an automatic transmission in a vehicle, the automatic transmission having neutral and forward ranges and an output shaft which is allowed to rotate in a reverse direction at a predetermined speed stage in the forward range but is prevented from rotation in the reverse direction at a different speed stage in the forward range, the shift control system comprising:

forward range detection means for detecting a shift from neutral to the forward range;

vehicle stop detection means for detecting that the vehicle has substantially stopped; and speed stage hold command means for establishing the different speed stage when, subsequent to establishing the predetermined speed stage as a result of a shift to the forward range, the vehicle is determined by a signal from said vehicle stop detection means to have substantially stopped.

10. A shift control system according to claim 9, wherein said vehicle stop detection means detects input rotational speed to the automatic transmission; and, when the input rotational speed detected by said input rotational speed detection means is not higher than a predetermined rotational speed, said speed stage hold command means determines that the vehicle has substantially stopped, and establishes the different speed stage.

11. A shift control system according to claim 9, wherein said shift control system further comprises:

timer means for counting time elapsed from detection of a shift to the forward range by said forward range detection means; and wherein, when the elapsed time counted by the timer means is at least equal to a predetermined time or when the vehicle is determined by a signal from said vehicle stop detection means to have substantially stopped, said speed stage hold command means establishes the different speed stage.

12. A shift control system for an automatic transmission in a vehicle powered by an engine, the automatic transmission having neutral and forward ranges and an output shaft which is connected to the engine and is allowed to rotate in a reverse direction at a predetermined speed stage set in the forward range but is inhibited from rotation in the reverse direction at a different speed stage in the forward range, the shift control system comprising:

forward range detection means for detecting a shift from neutral to the forward range;

means for detecting output of the engine; and speed stage hold command means for establishing the different speed stage when, subsequent to establishing the predetermined speed stage as a result of a shift to the forward range, the engine output detected by said engine output detection means is at least equal to a predetermined output value.

13. A shift control system according to claim 12, wherein said engine output detection means detects throttle opening; and wherein, when the throttle opening detected by said throttle opening detection means is at least equal to a predetermined value, said speed stage hold command means sets said automatic transmission to the different speed stage.

14. A shift control system according to claim 12, wherein said shift control system further comprises:

timer means for counting time elapsed from detection of a shift to the forward range by said forward range detection means; and wherein, when the elapsed time counted by the timer means is at least equal to a predetermined time or when the engine output detected by said engine output detection means is at least equal to a predetermined output value, said speed range hold command means shifts said automatic transmission to the different speed stage.

* * * * *